United States Patent [19] [11] 4,259,879
Watarai [45] Apr. 7, 1981

[54] CONTROL DEVICE FOR A DERAILLEUR
[75] Inventor: Etsuyoshi Watarai, Sakai, Japan
[73] Assignee: Shimano Industrial Company Limited, Sakai, Japan
[21] Appl. No.: 42,957
[22] Filed: May 29, 1979
[30] Foreign Application Priority Data
Jun. 2, 1978 [JP] Japan ................... 53-66968
[51] Int. Cl.³ .............................. F16C 1/22
[52] U.S. Cl. .................. 74/501.5 R; 74/489
[58] Field of Search ............ 74/217 B, 501.5, 489
[56] References Cited
U.S. PATENT DOCUMENTS
3,924,487 12/1975 Huret et al. ................ 74/489
3,943,794 3/1976 Shinada .................. 74/501.5 R
FOREIGN PATENT DOCUMENTS
2278982 3/1976 France ................. 74/501.5 R Primary Examiner—C. J. Husar
Assistant Examiner—Conrad Berman
Attorney, Agent, or Firm—Stevens, Davis, Miller & Mosher

[57] ABSTRACT

A control device for a bicycle derailleur cooperates with a control lever to control the derailleur through a control wire and absorb a change in length in the wire. The control device includes a positioning plate which serves to position the lever and is supported relatively rotatably under resistance greater than strength of a return spring at the derailleur, with respect to one of the lever and a fixing member supporting the lever, and is made freely rotatable with respect to the other, so that during operation of the lever for changing the bicycle speed the positioning plate, when subjected to a wire tension over a predetermined value, is secured to the lever or fixing member and, when subjected to a tension less than the predetermined value, is allowed to be freely rotatable, thereby automatically absorbing a change of length in the wire.

4 Claims, 8 Drawing Figures

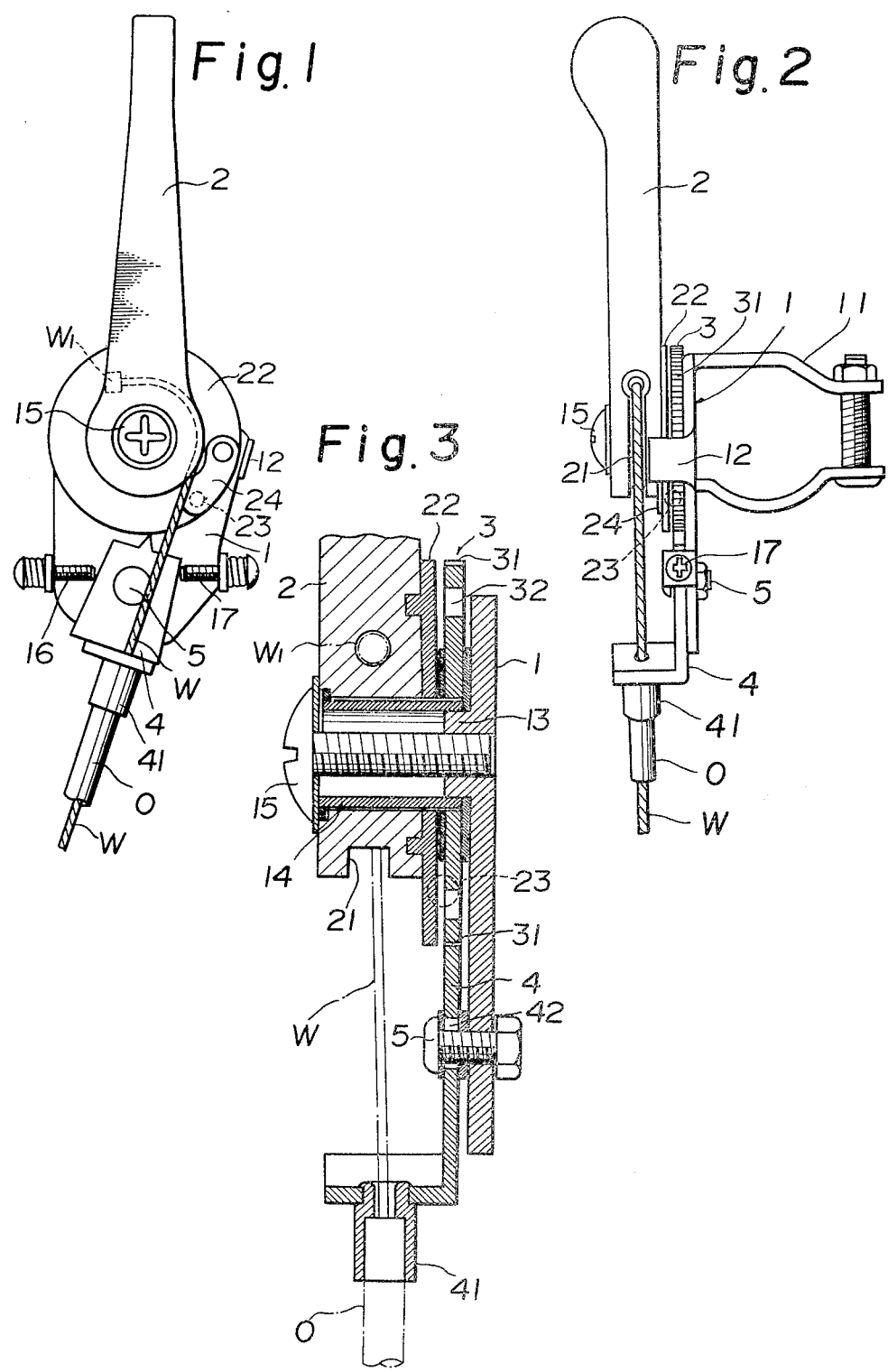

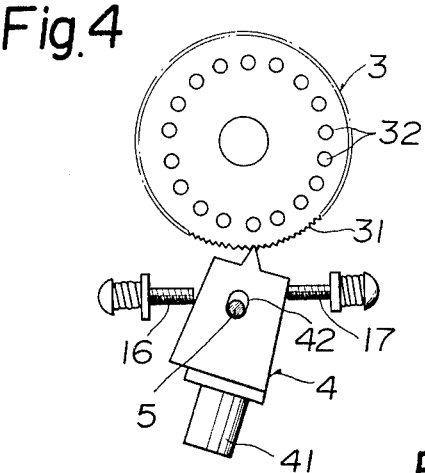
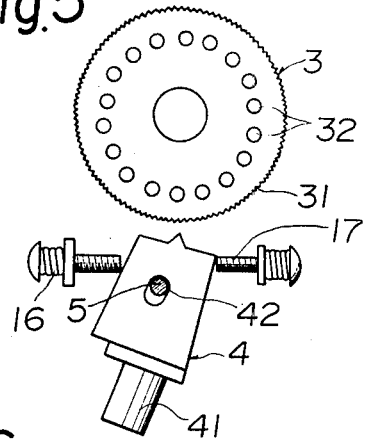
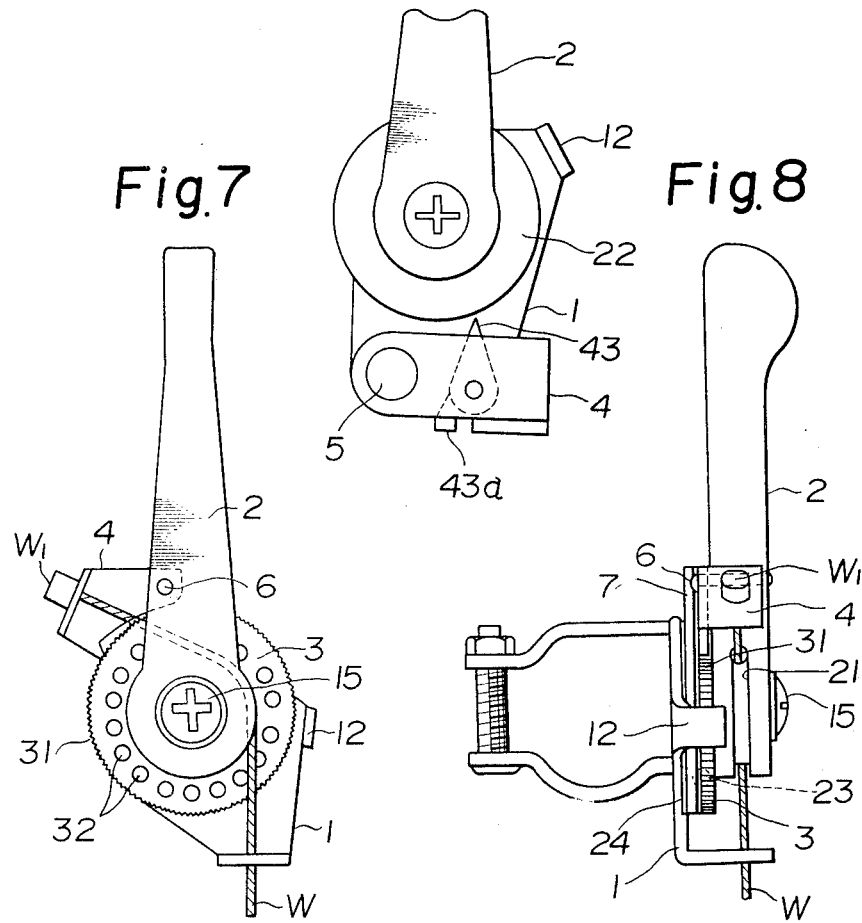
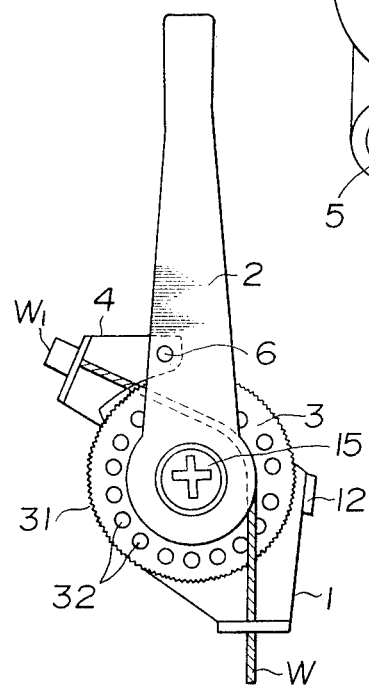

CONTROL DEVICE FOR A DERAILLEUR

This invention relates to a control device for a bicycle derailleur, and more particularly to a control device for operating a derailleur through a control wire operated by a control lever.

A bicycle derailleur is generally adapted to change a bicycle speed by movement of a control lever which moves, through an associated control wire, a movable member at the derailleur axially of a multispeed sprocket assembly, so that a driving chain may be switched to a selective one of sprockets by a chain guide at the movable member.

A change in the effective length of the control wire occurs through an extension of the control device or slack caused by adjustment of the derailleur or a contraction of an outer sheath guiding the wire. This effective length change causes the movable member to move improperly even when a proper lever operation is indicated, resulting in a poor speed change efficiency.

The above problem is readily solved by a skilled rider who corrects the lever control, for example, by a surplus lever control past a speed indication. However, unskilled riders are unable to do so, which becomes highly detrimental to the derailleur.

Conventionally, an adjust screw at the control lever has been used to remedy an extension of the wire, but accurate removal of the wire extension by a manual screw adjustment is difficult. Hence, automatic and accurate removal of a wire extension has heretofore been desired.

This invention has been designed to solve the problem of a change in effective lengths of the control wire. An object of the invention is to provide a control device for a derailleur, which is capable of accurately and reliably removing a change in the effective length of the wire caused by the extension of control wire or contraction of its outer sheath. The inventor has observed that it is necessary for proper control of a derailleur to apply tension of a predetermined value to the control wire, while the use of tension less than the predetermined value makes the proper control of a derailleur impossible. Hence, the control device of the invention has been designed to detect control were tension and use a change of tension less than the predetermined value to automatically absorb the extension of wire and thus permit proper control of the derailleur by the movement of the control lever.

In greater detail, the control device of the invention controls the derailleur through the control wire operated by the control lever and includes a positioning plate for positioning the control lever, the positioning plate being supported relatively rotatably, under predetermined resistance greater than the strength of a return spring at the derailleur, with respect to one of the lever and a fixing member supporting the lever and being freely rotatable with respect to the other, so that the tension of the wire, when exceeding the predetermined value during a speed change, fixes the positioning plate to the lever or the fixing member, and, when less than the predetermined value, allows the plate to rotate freely, thereby automatically absorbing a change in length of the wire.

To control lever positioning assembly of the invention includes a combination of receiving means engaging with a projection means and a visible indicator. The receiving means comprises a plurality of recesses spaced at intervals corresponding to the speed change stages, the receiving means comprises a ball or pin engageable with the receiving means, and the visible method comprises a plurality of indications spaced at intervals corresponding to the speed change stage and a pointer for the indications. Also, the projection and receiving means are used to apply the predetermined resistance to the positioning plate.

As an alternative arrangement, a dish spring or coiled spring may be used to apply frictional resistance. In any case, the resistance is made greater than strength of the return spring at the derailleur to rigidly hold the control lever in position.

These and other objects and novel features of the invention will become more apparent from the description of an embodiment thereof in accordance with the accompanying drawings, in which:

FIG. 1 is a front view of a first embodiment of the device of the invention,

FIG. 2 is a side view thereof,

FIG. 3 is a partially enlarged sectional view of the same,

FIGS. 4 and 5 are views explaining the operation of the first embodiment,

FIG. 6 is a schematic front view of a modification of the first embodiment in FIGS. 1 and 2, in which an actuator is changed, FIG. 7 is a front view of a second embodiment, and FIG. 8 is a side view thereof.

The device of the invention is mainly composed of a fixing member 1, control lever 2, positioning plate 3 and actuator 4. The first embodiment in FIGS. 1 and 2 and the second embodiment in FIGS. 7 and 8 are typical of the invention.

The fixing member 1 is made of a metallic plate and fixed to the bicycle frame, e.g., the top tube (not shown), through fixing means, such as a tightening band, provided at the rear side of the same. A stopper 12 is mounted to the side edge of fixing member 1 to restrict the lever turn. At a substantially intermediate portion of the fixing member 1 is provided a boss 13 having a threaded bore as shown in FIG. 3, or a lever shaft projecting to pivotally support the lever 2. In FIG. 3, a hollow lever shaft 14 is sleeved onto the boss 13 and a set screw 15 is screwed with the threaded bore at the boss 13 to thereby fix the lever shaft 14 to the fixing member 1.

The lever 2 is rotatably supported to the lever shaft 14. In the first embodiment in FIGS. 1 and 2, the lever 2 has at its base a groove 21 for winding therein a portion of the length of control wire W, the control wire W being retained at its end $W_1$ to the lever base and connecting the lever 2 and the derailleur at the rear wheel or gear crank of the bicycle. The lever 2 is turned to operate the derailleur through the control wire W.

The lever 2 is turned clockwise and counterclockwise in FIGS. 1 and 7 to control operation of the derailleur (not shown). The lever 2 is turned counterclockwise to pull the wire W against the return spring at the derailleur so that the wire W is wound in the groove 21. When the lever 2 is turned clockwise, the return spring acts to unwind the wire W from the groove 21. In either case, the wire W is subjected to a predetermined tension to operate the derailleur properly. For the convenience of explanation, the counterclockwise lever turn will hereinafter be called the pull operation and the clockwise lever turn the unwinding operation. A lever turn in either direction is also called a speed change operation.

In the first embodiment shown in FIGS. 1 and 2, the positioning plate 3 is supported to the lever shaft 14 at the fixing member 1 to be freely rotatable with respect thereto and relatively rotatable with respect to the lever 2 under resistance greater than the strength of the return spring at the derailleur, whereby the tension of control wire W allows the positioning plate 3 to be fixed to the fixing member 1.

In greater detail, the positioning plate 3 is composed of a disc provided at its outer periphery with a large number of serrations 31 and at substantially radially intermediate portions with receiving means 32, such as a large number of through bores or recesses provided circumferentially at intervals corresponding to those between speed change stages as shown in FIGS. 4 and 5, the positioning plate 3 being freely rotatably supported onto the lever shaft 14. A disc 22 is not-rotatably mounted to the lever 2 opposite to the positioning plate 3. At the disc 22 is provided a projection means 23, such as a ball or pin, engageable with the receiving means 32, and spring means 24 like a leaf spring, so that the projection means 23 may be engaged with the receiving means 32. Lever 2 is supported opposite to the positioning plate 3 and onto the lever shaft 14 in relation of being freely rotatable with respect thereto.

The projection means 23 and receiving means 32 constitute the positioning mechanism for the lever. The resilient engagement of projection means 23 with receiving means 32 through the spring means 24 applies resistance to the positioning plate 3 with respect to the lever 2, the resistance allowing lever 2 to be relatively rotatable with respect to the positioning plate 3.

The tension of control wire W, when equal to or greater than the predetermined value, is used to fix the positioning plate 3 to the fixing member 1. In detail, an actuator 4 carrying at an end nose thereof a holder 41 for an outer sheath O which guides the wire W and having a slot 42 at a substantially intermediate portion is pivotally supported to the fixing member 1 through a pivot 5 inserted into the slot 42, thereby being movable within a range controlled by the slot 42. When the control lever is turned to pull the wire W for changing the bicycle speed, the reaction force to the tension of wire W is applied to the outer sheath O, whereby the actuator 4 is subjected to the reaction force by way of the holder 41 securing the outer sheath O. Hence, the actuator 4 is moved toward the positioning plate 3 and engages at the tip with the serrations 31 at the plate 3. Two restrainers 16 and 17 are provided at the fixing member 1 so as to restrain the swinging motion of actuator 4. Thus, the positioning plate 3 in engagement with the rigidly held actuator 4 is fixed with respect to the fixing member 1.

In this arrangement, rotational resistance R applied to the positioning plate 3 by the engagement of projection means 23 with receiving means 32 is set greater than strength F of the derailleur return spring. The tension of wire W, in other words, the reaction force applied to the outer sheath O, corresponds to the strength F, whereby the force fixing the positioning plate 3 through the engagement of actuator 4 therewith is given by the product of friction factor $\mu$ and tension (reaction force) or strength F.

Accordingly, the friction factor M is set so that the fixing force $\mu F$ may overcome the resistance R when the tension of wire W exceeding the predetermined value keeps the proper relative length between the wire W and the outer sheath O.

In consideration of the above matter, it is preferable that the pawllike shaped tip of actuator 4 is engaged with the serrations 31 at the outer periphery of positioning plate 3 as shown in FIGS. 4 and 5, but the serrations 31 are not invariably necessary when the fixing force is availabe.

Next, operation of the device, when the extension of wire W or contraction of outer sheath O causes a change in the effective length of wire W, will be described. The change in the effective length reduces the wire tension which thereby decreases the fixing force MF. As a result, the resistance R, when the fixing force is overcome, allows the positioning plate 3 to rotate together with the lever 2 when the latter is turned for changing the bicycle speed. In other words, the reduced tension leads to a decrease in the reaction force, whereby the actuator 4 tends to leave the positioning plate 3 as shown in FIG. 5. Thus the fixing force $\mu F$ which is smaller than the resistance R allows the positioning plate 3 to become unfixed and freely rotatable with respect to the fixing member 1, resulting in rotation of the positioning plate 3 together with the lever 2.

Consequently, relative position between the lever 2 and the positioning plate 3 is not changed, so that the positioning mechanism therebetween is inactive. In other words, since the lever 2 is not-rotatable relative to the positioning plate 3, the positioning mechanism comprising the receiving means 32 and projection means 23 is inactive, thereby enabling the rider to further turn the lever 2.

Hence, the lever 2 further turns to automatically remove the extension of wire W of contraction of outer sheath O. The wire W, after the extension or contraction is then removed, is subjected to tension equal to or greater than the predetermined value and this tension causes the actuator 4 to reengage with the serrations 31 as shown in FIG. 4, thereby fixing the positioning plate 3 to the fixing member 1.

The fixture of positioning plate 3 by activator 4 enables the lever 2 to rotate with respect thereto, whereby the positioning mechanism acts to hold the turned lever 2 at a position corresponding to the desired speed change stage for controlling the derailleur.

The projection and receiving means 23 and 32 in the described embodiment may be replaced by marks provided at the positioning plate 3 for respectively indicating the speed change stages and by a pointer therefor provided at the lever 2 or opposite disc 22, thereby forming the positioning mechanism. In this instance, a dish spring or coil spring may be used, in place of the projection and receiving means 23 and 32, to allow the lever 2 or opposite disc 22 to be in frictional contact with the positioning plate 3, thereby constituting the resistance applying means.

Furthermore, in place of the described restraint on the actuator's swinging motion by the restrainers 16 and 17 as shown in FIG. 1, the actuator 4 may, as shown in FIG. 6, be pivoted to the fixing member and have a pawl 43 which is pivoted to the same and has a stopper 43a. Hence, the pawl 43 may, when the lever 2 is operated to unwind the wire W, be engaged with the serrations 31 at the positioning plate 3 and rigidly held by the stopper 43a, thereby being integrated with the actuator 4.

Next, a second embodiment of the invention which is shown in FIGS. 7 and 8 will be described.

The second embodiment is different from the first embodiment utilizing the reaction force applied to the outer sheath O and, in fact, has no outer sheath. In the second embodiment, the positioning plate 3 is made freely rotatable with respect to the lever 2 and is supported rotatably under the resistance R with respect to the fixing member 1, the positioning plate 3 being fixed to the lever 2 when the tension of wire W is equal to or more than the predetermined value.

In greater detail, the actuator 4 is movably supported to the lever 2 through a pin 6 and the wire W is fixed at its end $W_1$ to the actuator 4. The tip of activator 4 is made engageable with the serrations 31 at the outer periphery of positioning plate 3. To the fixing member 1 is fixed a disc 7 opposite to the positioning plate 3, and projection means 23 is mounted to the disc 7 through spring means 24.

Accordingly, in the second embodiment, when the tension of wire W is less than the predetermined value due to a change in the effective length of wire W caused by extension thereof, the lever 2 only is, as in the first embodiment, turned to pull the wire W and the positioning plate 3 is stationary, whereby the positioning mechanism formed by projection means 23 and receiving means 32 between the opposite disc 7 and the positioning plate 3 is inactive.

Hence, the lever 2 turns to remove the extension of wire W and then the tension thereof reaches or exceeds the predetermined value so as to actuate the actuator 4 to be engaged at the tip thereof with the serrations 31 and the positioning plate 3 is fixed to the lever 2 to thereby rotate integrally therewith. As a result, the positioning mechanism acts to settle the turned lever 2 at the position corresponding to the desired speed change stage for operating the derailleur.

In the second embodiment, the actuator 4 is pivoted to the lever 2. As an alternative, the actuator 4 may be inserted between the lever 2 and the positioning plate 3 and supported rotatably onto the lever shaft 14. A cam means is formed between the actuator 4 and the lever 2, so that when the tension of wire W is equal to or greater than the predetermined value, the cam means acts to allow the actuator 4 to be integrated with the lever 2 and to be shifted toward the positioning plate 3, thereby fixing the positioning plate 3 to the lever 2 through the actuator 4.

Also, in the second embodiment, the positioning mechanism and resistance applying means are not limited to a projection means 23, spring means 24 and recess-like receiving means 32.

As clearly understood from the above description, the control device of the invention is capable of automatically and reliably removing a change in the effective control wire length created by an extension of the control wire or a contraction of the outer sheath. After removal of the effective length change, the lever control is settled in position, thereby ensuring a proper operation of the lever and the change-over of the driving chain by the derailleur.

While preferred embodiments of the invention have been described using specific terms, such description is for illustrative purpose only, and it is to be understood that changes and variations may be made in the invention without departing from the spirit or scope thereof, the invention being limited solely by the following claims.

What is claimed is:

1. A control device for removing the effect of changes in the length of a control wire which operates a derailleur having a return spring, said control device comprising:
   (a) a fixing member having a lever shaft;
   (b) a control lever for operating said derailleur, said control lever being rotatably supported to said lever shaft and connected with an end of said control wire;
   (c) a positioning plate rotatably supported to said lever shaft;
   (d) resistance applying means for applying rotational resistance to said positioning plate to cause said positioning plate to resist rotating with respect to one of said fixing member and lever, said positioning plate being made freely rotatable with respect to the other of said fixing member and lever, said rotational resistance being greater than the strength of said return spring; and
   (e) an actuator contacting with said positioning plate to control said free rotation thereof, said actuator being movable in accordance with the tension in said wire such that when said tension is equal to or greater than a predetermined value said actuator restrains said positioning plate from free rotation with respect to said other of said fixing member and lever, and when the tension in said wire is less than said predetermined value said actuator allows said positioning plate to freely rotate to permit automatic adjustment of a change in length of said control wire upon rotation of said lever.

2. A control device for a derailleur according to claim 1, wherein said control wire has an outer sheath guiding said wire, said positioning plate is freely rotatable with respect to said fixing member, the rotation of said positioning plate with respect to said lever is subjected to said resistance greater than the strength of said return spring at said derailleur, and said actuator is supported movably to said fixing member and supports said outer sheath.

3. A control device for a derailleur according to claim 1, wherein said positioning plate is freely rotatable with respect to said lever, the rotation of said positioning plate with respect to said fixing member is subjected to said resistance greater than the strength of said return spring at said derailleur, and said actuator is supported movably to said lever and supports said control wire.

4. A control device for a derailleur according to claim 1, wherein between said positioning plate and one of said fixing member and lever is provided a positioning mechanism comprising a projection means, a plurality of receiving means for receiving said projection means, and means for biasing said projection means into engagement with said receiving means, said positioning mechanism serving as said resistance applying means for applying to said positioning plate rotational resistance with respect to one of said fixing member and lever.

* * * * *